United States Patent [19]

Louk et al.

[11] Patent Number: 5,234,076
[45] Date of Patent: Aug. 10, 1993

[54] TREE STAND

[76] Inventors: Robert L. Louk, 2013 Hastings Rd., Gautier, Miss. 39553; John M. Louk, P.O. Box 318, Leaksville, Miss. 39451

[21] Appl. No.: 794,781

[22] Filed: Nov. 18, 1991

Related U.S. Application Data

[63] Continuation of Ser. No. 583,035, Sep. 14, 1990, abandoned.

[51] Int. Cl.⁵ .................................................. E04G 3/00
[52] U.S. Cl. ..................................... 182/187; 182/135
[58] Field of Search ............... 182/187, 188, 134, 135, 182/53; 108/152

[56] References Cited

U.S. PATENT DOCUMENTS

| | | | |
|---|---|---|---|
| 1,176,225 | 3/1966 | Lloyd | 182/188 |
| 3,067,975 | 12/1969 | Wilcox | 182/187 |
| 4,137,995 | 2/1979 | Fonte | 182/187 X |
| 4,232,203 | 10/1980 | Sweat | 182/187 X |
| 4,316,526 | 2/1982 | Smacker | 182/187 X |
| 4,331,216 | 5/1982 | Smacker | 182/135 |
| 4,417,645 | 11/1983 | Untz | 182/187 X |
| 4,428,459 | 1/1984 | Peck | 182/187 |
| 4,452,338 | 6/1984 | Untz | 182/187 |
| 4,549,633 | 10/1985 | Merritt | 182/187 X |
| 4,648,483 | 3/1987 | Skyba | 182/134 X |
| 4,705,143 | 11/1987 | Ziembor | 182/187 |
| 4,726,447 | 2/1988 | Gibson | 182/187 X |
| 4,776,503 | 10/1988 | Sink | 182/187 X |
| 4,890,694 | 1/1990 | Williams | 182/187 |
| 4,909,353 | 3/1990 | Govin | 182/187 |
| 4,942,942 | 7/1990 | Bradley | 182/187 |
| 4,953,662 | 9/1990 | Porter | 182/135 |
| 5,050,704 | 9/1991 | Olsson | 182/135 X |
| 5,097,925 | 3/1992 | Walker, Jr. | 182/135 |

Primary Examiner—Karen J. Chotkowski
Assistant Examiner—Korie H. Chan
Attorney, Agent, or Firm—Cushman, Darby & Cushman

[57] ABSTRACT

A hunter's tree stand, typically of two platform construction. Both platforms have a supporting metal frame, one covered with an open metal grid for standing, and the other having a web fabric seat for comfortable seating. Each platform is supported by rigid, folding side rails, which fold for easy storage. A flexible, encased steel cable extends from one side rail around the trunk of the tree, and is fastened to the other side rail, and adjusted in length by a snap ring clip, a blunt round edge toothed blade extends from the metal frame, and, in combination with the encased cable, holds the stand securely to the tree under load, but without penetrating the bark or otherwise injuring the tree. The encased cable and folding supports conform to the shape of the tree, and give the user a secure feeling both while climbing and while sitting or standing in the elevated stand.

16 Claims, 3 Drawing Sheets

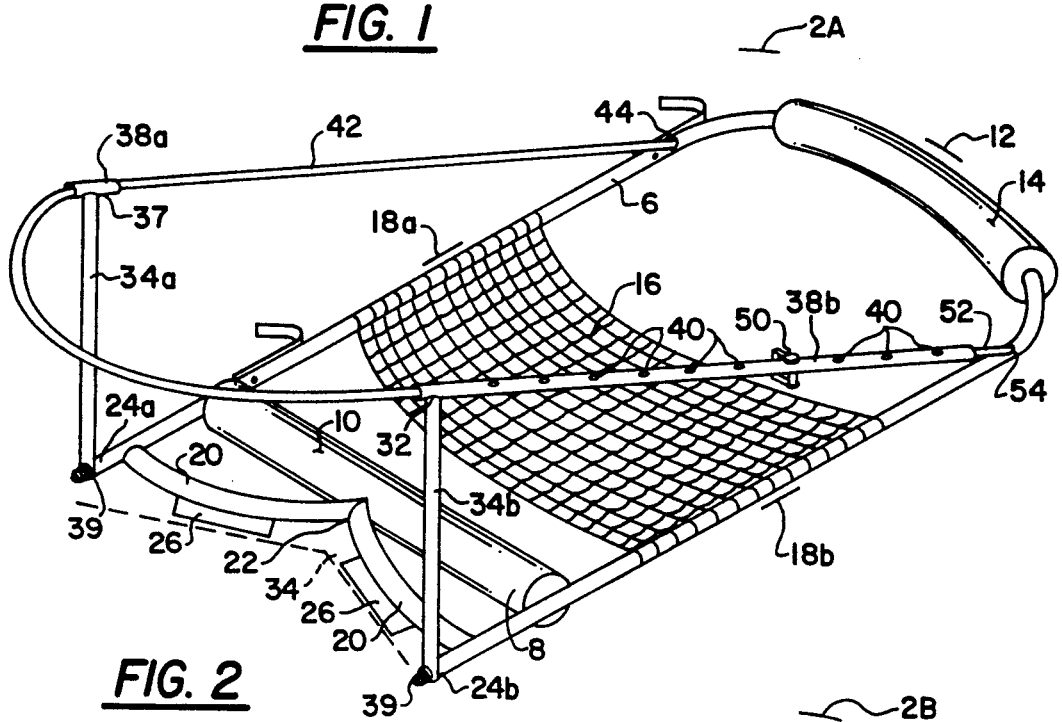

TREE STAND

This application is a Continuation of our co-pending U.S. application Ser. No. 07/583,035, field Sept. 14, 1990, now abandoned.

BACKGROUND OF THE INVENTION

This invention relates to the field of hunting tree stands. Such stands have been developed and are known for providing a positioning for still hunters in forests. They derive from fixed tree mounted hunting platforms, and were devised to provide a portable apparatus for temporary installation in trees for supporting hunters. Such stands, in order to be safe, involve combinations of various penetrating attachments to fix the stand to the tree for support it has been found that such penetration, especially of the living inner bark, injures the tree, rendering it more susceptible to insect infestation or disease. This problem is considered sufficiently acute that many forest mangers, especially in the lumber and paper industries now ban the use of tree stands.

Tree stands of the current art use various forms of attachment to the tree; such are shown in U.S. Pat. Nos. 4,452,338; 4,417,645; 4316526; 4796364; 4247030; 4331216; 4742888; 4669194 and in the commercially sold unit under the trademark "Porta-climb". All these attachments are relatively rigid, and as the climber ascends, the stand tends to rock or sway under the user's movement.

SUMMARY OF THE INVENTION

A tree stand for hunters is constructed of two platforms. Both platforms have a supporting metal frame, one covered with open metal grid for standing, and the other having a web fabric seat for comfortable seating. Each platform is supported by rigid, folding side rails, which fold for easy storage. A flexible, encased steel cable extends from one side rail around the trunk of the tree, and is fastened to the other side rail, and adjusted in length by a snap ring clip. A blunt, round edged toothed blade extends from the metal frame, and, in combination with the encased cable, holds the stand securely to the tree under load, but without penetrating the bark or otherwise injuring the tree. The encased cable and folding supports conform to the shape of the tree, and give the user a secure feeling both while climbing and while sitting or standing in the elevated stand.

It is an object of my invention to disclose a tree stand which reduces the chances of damage to the supporting tree.

It is a further object of my invention to disclose a tree stand which may be folded into a compact form for shipment and storage without reduction of strength.

It is a further object of my invention to show a tree stand which has improved attachment to the tree.

A further object of my invention is to provide an increased feeling of stability, comfort and safety to the user of a tree stand.

A further object of my invention is to provide a tree stand having an improved, attachment to a tree, which is more stable, yet is easily adapted to various size trees.

A further object of my invention is to show a tree stand which may be quickly set up for any size tree and as quickly taken down and prepared for storage or travel.

These and other objects of my invention may be seen in the detailed description of the invention which follows.

BRIEF DESCRIPTION OF THE DRAWINGS

FIG. 1 is a view of the upper, seating platform of my invention.

FIG. 2 is a view of the lower, standing platform of my invention.

DETAILED DESCRIPTION OF THE PREFERRED EMBODIMENT

Figure 3:
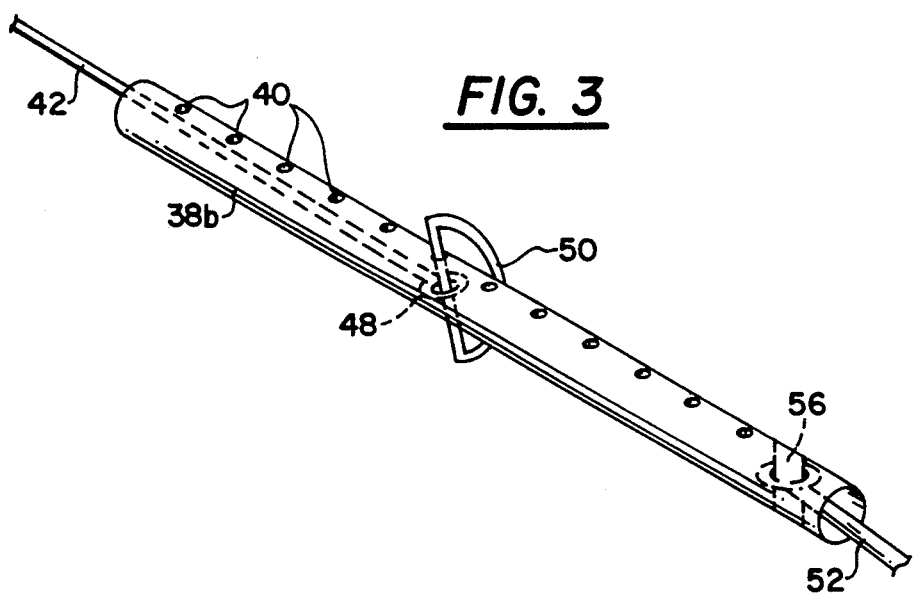
FIG. 3 is a detail view of the cable attachment to the folding sides of the invention.
Figure 4:
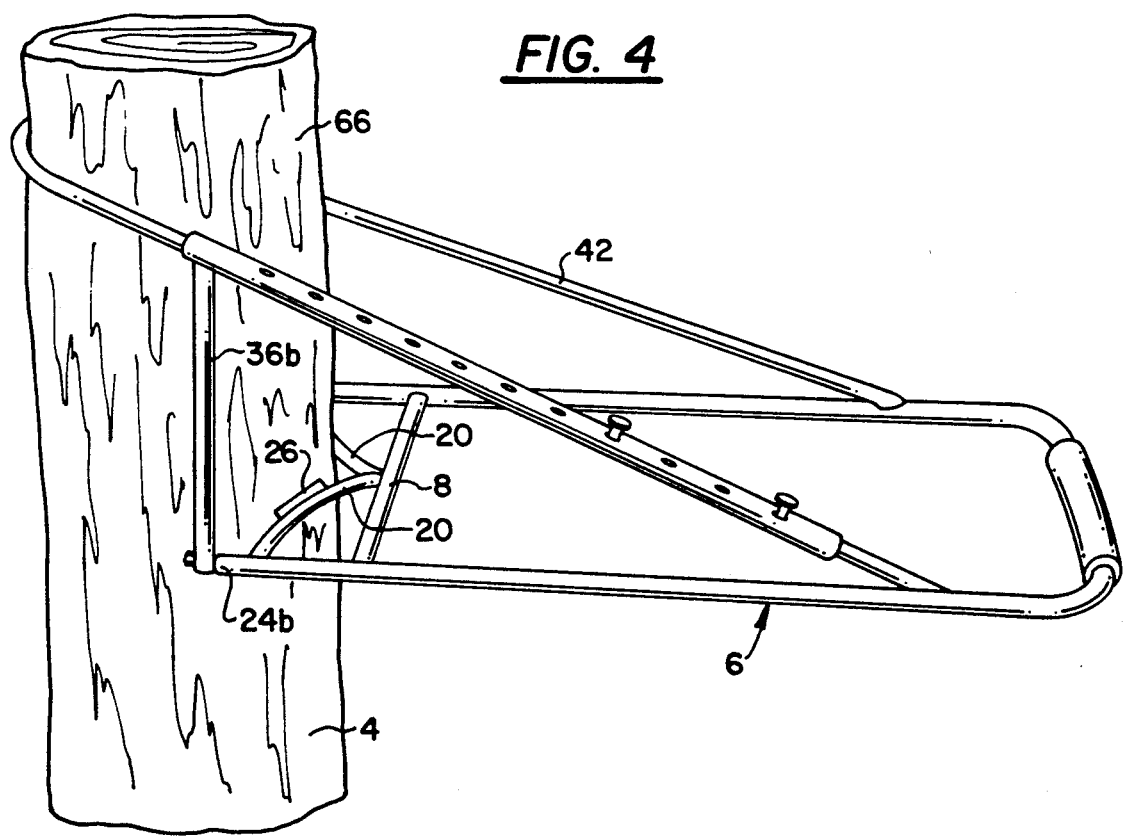
FIG. 4 is a view of the attachment of the stand to a tree, showing a cut away tree bark section.
Figure 5:
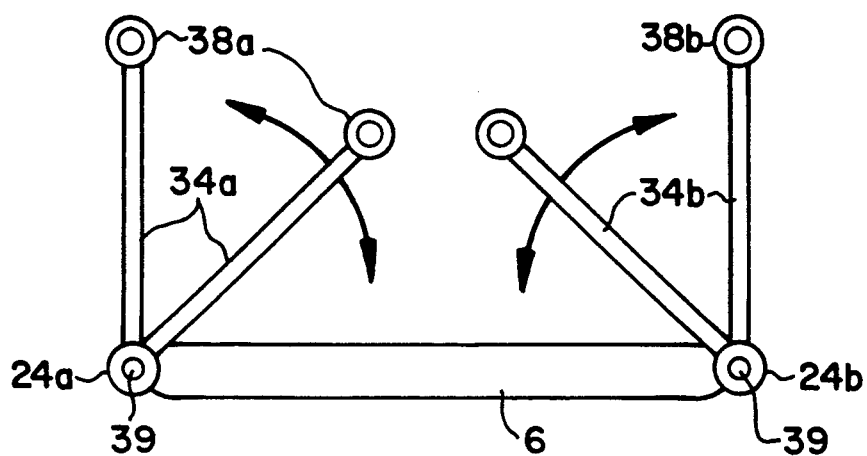
FIG. 5 is an end view of a platform of the invention showing the folding sides for storage or travel.
Figure 6:
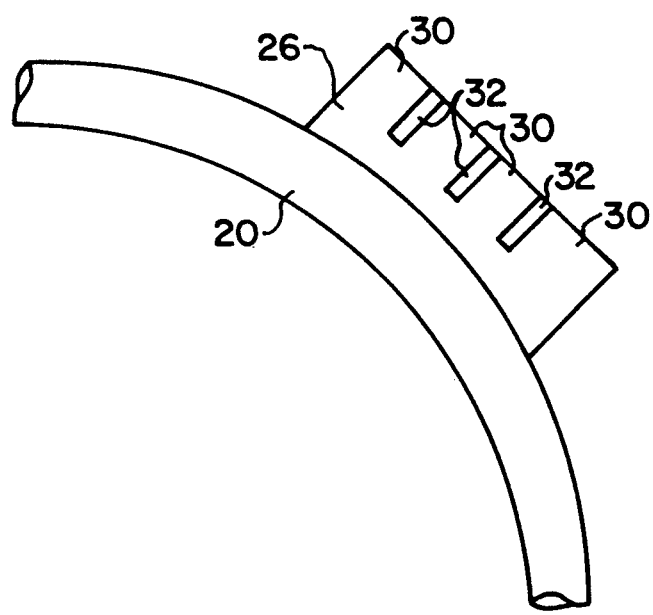
FIG. 6 is a view of the blades of the stand.

Referring to FIGS. 1 and 2, the inventive tree stand 2 comes as two units, each embodying the inventive features below claimed. These two units are referred to herein as the seating platform 2A and the standing platform 2B respectively, and this terminology will be apparent to those skilled in the use of such platforms.

Two such platforms are provided so as to permit climbing action up the trunk 4 of a tree, by successive movement of first one and then the other platform, while the user is supported by the tree stand. This use will be further shown below.

FIG. 1 shows the seating platform 2A, which in use is always the upper platform of the two. Seating platform 2A is comprised of an outer peripheral frame 6 which defines the shape of each platform 2 and is the main structural member of each platform 2. This frame 6 is made preferably of $\frac{3}{4}$ or 1 inch electrical conduit, which combine the requisite qualities of rigidity, lightness and strength. Any suitable tubing may, of course, be substituted. The frame 6 is in the form of an open U. An cross support 8 braces the open end of the U; this cross support 8 is also of conduit or tubing, preferably fastened to frame 6 by welding. Cross support 8 may also optionally be covered with a soft, water resistant padding such as vinyl covered foam. This cross support 8 is spaced a distance from the open end of the frame 6.

For user comfort, the base 12 of the U shape of the frame 6 may optionally also be covered with a padding 14; this serves to protect the user's knees when moving from an outward facing sitting position.

A flexible net or fabric seat 16 extends from one side 18a of the frame 6 to the other side 18b; this net seat 16 preferably is free to slide along the frame sides 18a,b, permitting it to be positioned as desired by the user.

Two arcuate tree base support tubes 20 extend from a point 22 at the center of to cross support 8 to points near the open ends 24a,b of the frame 6. As these arcuate tree base support tubes 20 bear the weight of tree stand 2 and user, they are of a heavier construction than the frame 6, typically being 1 inch diameter conduit or $\frac{1}{2}$ inch diameter tubing or conduit, but otherwise are hollow steel tubes, fastened preferably by welding.

Along the outer curve of each tree base support tube 20, extending for a distance near the middle of each base support tube, are welded support blades 26. Each blade 26 generally is tangent to the curvature of the base support tube 20, and is formed of a thick, rectangular plate having a blunt, rounded outer edge 28, which is interrupted to form broad blunt segments or teeth 30.

Typically the support blades 26 are four inches wide and about ⅛ inch thick; the individual segments 30 are about 1 inch wide each, there being four such segments 30, separated by small spaces 32.

The placement of the blades 26 and segments 30 is such that the base support (blades and base support tubing) has the aspect of an nearly right or obtuse angle. As a result, for a wide variation in tree trunk 4 diameters, each blade 26 is tangent to the tree trunk for best support.

Along the sides of the frame 6 are folding side supports 36a,b. A first side support 36a is a length of conduit, of the same size as the frame 6, terminating at one end 37 in a T-shaped cross tubing section 38a; the other end 39 is to the end 24a of the frame by a pivotal attaching means the side support 36 is perpendicular to the side 18 of the frame 6, but can fold from an upright position to a position flat against the frame 6. The second side support 36b is similar except that the T-shaped cross tubing section 38b is extended for a distance along the length of the side 18b of the frame 6 to a point adjacent the frame 6, forming a triangular cross section with respect to the side 18b of the frame. This elongate T-shaped cross tubing section 38b is provided with periodic through holes 40.

A support cable 42, preferably comprised of a steel cable covered with a rubber outer tubing, is affixed at a first end to the frame at a point 44 near the base of the U-shape. This cable 42 extends from this point of fixation 44 through the first side support T-shaped cross tube 38a; it terminates in a second, free end 48 which is a closed loop adapted to receive a fastening pin 50. A second, short cable stub 52 is affixed at a first end to the frame at a point 54 near the base of the U-shape, but on the opposite side 18b from the support cable 42; this stub cable 52 is affixed at its other end 56 into the second side support 36b.

The free end 48 of the cable 42 may be inserted into the second side support T-shaped cross tube 38b, forming a tree trunk enclosing loop; the size of this loop is adjusted by fastening the free end 48 within the cross tube 38b by a PTO ring 50 inserted through one of the periodic holes 40 provided in the cross tube 38b.

The second platform 2B is constructed in the same manner as the first except that, instead of a seat 16, a rigid supporting floor base 60 is provided of expanded metal, for example of 13 gauge, fastened to the frame 6 by welding. Additional cross supports 62 may be provided to stiffen the floor base 60 to support the weight of a standing user.

Across the frame 6, fastened above the floor base 60, is and ajustable foot strap 64. This foot strap 64 may be cloth belting, fastened to the frame 6 at each side 18 and to the floor base 60 in the center of the foot strap 64, forming two loops adapted to receive the toe of a user's boots.

In use, the side support 36a,b of both platforms 2 are unfolded. The second, standing platform 2B is then attached around a chosen tree by running the cable free end 48 around the trunk 4 and fastening in within the cross tube 38b with a PTO ring 50 so that the tree trunk 4 is closely but not tightly encircled. When the platform 2 is so adjusted, it may be raised a distance up the trunk 4. The weight of the platform 2 is sufficient so that the combination of the support cable 42 and the blunt blades 26 grip the tree, supporting the platform 2. The blades 26 grip the bark 66 of the tree but do not penetrate the inner bark 68, and thus no damage occurs to the tree. Any slippage due to the lack of penetrating spikes is prevented by the conformable, opposing grip of the support cable 42, which conforms to the shape of the trunk.

Since the cable 42 is flexible, any downward movement of the platform 2 through slippage does not immediately move the cable 42; rather, the cable 42 creates an initial pull upward on the folding side supports 36 to counteract any tendency of the blunt blades 26 to slip. All forces on the cable 42 can only be tension forces; since only cable connects the outer portion of the frame 6 to the tree 4. At the point of affixation 44 of the cable 42 and cable stub 52 to the frame 6, and at the point of affixation 54 of the cable stub 52 to the frame 6, both cable and cable stub form an acute angle with respect to the frame 6. The tension forces through the cable and cable stub are thus nearly aligned with the longitudinal axis of the frame 6, and any movement results in a reacting force through the cable 42 which urges the platform 2 more firmly into the trunk 4 of the tree. The result is an adjustable platform 3, which is extremely resistant to downward slippage, but which does not penetrate the inner bark 68 of the tree or harm it in any way.

Once the standing platform 2B is fastened around the tree, the user then stands on this platform and fastens, in the same manner, the seating platform 2A to the tree. Since this platform 2A should be at waist level, the user's body must be inserted within the frame 6. For ease of such use, the seat 16 is slidable along the frame sides 18, so that it can be easily moved out of the way. Alternatively, seat 16 may be formed of a padded folding seat, fastened between sides 18.

Once the seating platform 2A is fastened to the tree 4, above the standing platform 2B, the user may easily adjust platform height by sitting in the seat 16, and, placing his feet in the foot strap 64, may easily raise the standing platform 2B, or by standing on the standing platform 2B, raise the seating platform 2A. For extended hunts, the seat 16 provides a comfortable, adjustable seat for a relaxed posture, yet the hunter may readily come to a standing position, free of the seat 61 which moves out of the way.

It can thus be seen that the invention provides a more effective attachment of a hunting platform to a tree, without the damage to the tree of the prior art tree stands, and with a significant increase in versatility of use.

I claim:

1. A tree stand platform comprising:
    a mainframe member having a front end portion for engaging a tree, a rear end portion, and sides opposite one another connecting said front and rear end portions;
    first and second members each having a first end pivotally coupled to the main frame member by pivotal attaching means adjacent the front end thereof and, respectively, on said opposite sides so that said first and second members pivot toward one another, and a second end spaced from said first end; and
    a flexible connector secured to the main frame member and engaging the second ends of each of the first and second members, for holding the platform to the tree so that as the weight is applied to the frame member, said first and second members pivot toward one another as the flexible connector tightens about the tree on which the tree stand is mounted.

2. A tree stand as in claim 1 wherein the flexible connector is adjustable in length relative to said main frame.

3. A tree stand as in claim 1 wherein the flexible connector extends through at least a portion of the main frame.

4. A tree stand as in claim 1 wherein said first and second members interact with said flexible connector so that said first and second members move into contact with a tree on which the tree stand is mounted.

5. A tree stand as in claim 4 wherein the second ends of said first and second members are comprised of a support structure slidably retaining said flexible connector so that said flexible connector can move in at least one direction relative to said upper end and yet be restrained in at least two other directions.

6. A tree stand as in claim 5 wherein said second end support structure comprises a tubular member.

7. A tree stand as in claim 1 wherein said main frame and said first and second members are comprised of tubing.

8. A tree stand as in claim 7 wherein said tubing is metal.

9. A tree stand as in claim 1 wherein said front portion includes a tree support structure connected to and extending across said main frame so that said support structure will abut the tree when the tree stand is in place and said first and second members are positioned forward of said front portion.

10. A tree stand as in claim 9 wherein said tree support structure includes a cross-member fixed to and extending across said main frame and a pair of arcuate members extending outwardly from the mid-point of said cross member and intersecting the main frame at a point forward of said cross-member.

11. A tree stand as in claim 10 further including tree gripping members fixed to said pair of arcuate members.

12. A tree stand as in claim 1 further including a cross-frame support member.

13. A tree stand as in claim 12 wherein said cross-frame support member is comprised of netting.

14. A tree stand as in claim 5 wherein said flexible connector is adjustably mounted to one of said second ends.

15. A tree stand as in claim 1 wherein said flexible connector is secured to the rear end portion.

16. A tree stand as in claim 1 further including a foot step fixed to said main frame.

* * * * *